(12) United States Patent
Naik et al.

(10) Patent No.: US 7,976,727 B1
(45) Date of Patent: Jul. 12, 2011

(54) CHROMIUM-DOPED ZINC-NITRO-ANTIMONY-GALLIUM-TELLURIUM INFRARED PHOSPHORS

(75) Inventors: Rajesh R. Naik, Dayton, OH (US); Lawrence L. Brott, West Chester, OH (US); George D. Jia, Lock Haven, PA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 12/862,869

(22) Filed: Aug. 25, 2010

(51) Int. Cl.
C09K 11/70 (2006.01)
C09K 11/77 (2006.01)
(52) U.S. Cl. .......................... 252/301.6 R; 252/301.4 R
(58) Field of Classification Search ............ 252/301.6 S, 252/301.4 R, 301.6 R, 301.6 F, 301.4 F, 700; 530/802; 313/467, 468
See application file for complete search history.

(56) References Cited

U.S. PATENT DOCUMENTS

| | | | | |
|---|---|---|---|---|
| 5,622,653 A * | 4/1997 | Orita et al. | ................. | 252/519.1 |
| 7,303,697 B2 * | 12/2007 | Isobe | ..................... | 252/301.6 F |
| 7,312,575 B2 * | 12/2007 | Zeng et al. | .................... | 313/582 |
| 2009/0166584 A1 * | 7/2009 | Shimooka et al. | ...... | 252/301.4 F |
| 2009/0243467 A1 * | 10/2009 | Shimizu et al. | ............... | 313/503 |
| 2010/0001346 A1 * | 1/2010 | Ye | ................................ | 257/347 |

FOREIGN PATENT DOCUMENTS

KR 2006100056 A * 9/2006

* cited by examiner

*Primary Examiner* — Jerry Lorengo
*Assistant Examiner* — Lynne Edmondson
(74) *Attorney, Agent, or Firm* — AFMCLO/JAZ; Bart S. Hersko

(57) ABSTRACT

This patent covers infrared phosphorescent materials which exhibit extended persistence lifetimes and are composed of mixtures of the elements zinc, antimony, gallium, tellurium, oxygen and nitrogen, and are doped with varying amounts of chromium, neodymium, dysprosium, yttrium or thulium. A typical formula is given by $Zn_{(1-n\%-m\%-l\%)}Sb_xGa_{2-x}Te_zO_{4+2z-y}N_y$: n % $Cr^{3+}$, m % P, l % Q, where Zn is zinc, Sb is antimony, Ga is gallium, Te is tellurium, O is oxygen, N is nitrogen. Additionally, x (0 to 2) y (0 to 0.5) and z (0 to 1) are the molar concentration in the composition. $Cr^{3+}$ is the doped chromium ion, P is a codopant and Q is a second codopant and n, m, l are the concentration respectively (m,m,l are from 0.1 to 10). An example is the material $ZnSbGaTeO_{5.95}N_{0.05}$:3% $Cr^{3+}$, 1% $Nd^{3+}$, which has an emission peak at 760 nm and a persistent time of over 20 hours (measured with Fluorolog-3 spectrometer with a PMT detector).

2 Claims, 2 Drawing Sheets

US 7,976,727 B1

CHROMIUM-DOPED ZINC-NITRO-ANTIMONY-GALLIUM-TELLURIUM INFRARED PHOSPHORS

RIGHTS OF THE GOVERNMENT

The invention described herein may be manufactured and used by or for the Government of the United States for all governmental purposes without the payment of any royalty.

BACKGROUND OF THE INVENTION

ZnS:Cu, Co was developed in the 1940s and is one of the earliest commercialized long persistent phosphors to be used in display applications. Similar materials, such as alkali earth sulfides, were also discovered in the 1970s to have long persistence and were termed "Lehmann phosphors". Defect-induced trapping mechanisms were studied to improve the persistence times using techniques such as co-doping ions to increase trap populations. Examples include modifying CaS: $Eu^{2+}$ to CaS:$Eu^{2+}$, $Tm^{3+}$, or CaS:$Bi^{3+}$ to CaS:$Bi^{3+}$, $Tm^{3+}$. With codopants, persistence times were increased from tens of minutes to over an hour. Also in the 1970s, some alkali earth aluminates, such as $SrAl_2O_4$:$Eu^{2+}$, were found to have a persistent afterglow. See, for example, Abbruscato, V. *J. Electrochem. Soc.* 1971, 118, 930-933

In 1990s, the discovery of $SrAl_2O_4$:$Eu^{2+}$, $Dy^{3+}$ and $CaAl_2O_4$:$Eu^{2+}$, $Nd^{3+}$ was notable since the persistent times were extended an order of magnitude. See, for example, Matsuzawa, T.; Aoki, Y.; Takeuchi, T.; Murayama, Y. *J. Electrochem. Soc.* 1996, 143, 2670-2673 and Yamamoto, H.; Matsuzawa, T. *J. Lumin.* 1997, 72-74, 287-289. Soon afterwards, a limited number of materials were found with similar properties. Current research focuses on modifying the color of the phosphor's emission. To date, persistent phosphors excited with solar radiation emit from blue to orange.

The design of a long persistent phosphor typically follows a route that begins with finding a proper host material and activator that emits in the designed wavelength, followed by identifying proper co-dopants to populate traps, and finally to manipulate ground state distance to the host conduction band to achieve solar pumping. In this patent application, long persistent near infrared phosphors have been developed following such a route.

Persistent infrared (IR) phosphors have been studied for only about five years. An initial material was a visible red persistent phosphor CaS:$Eu^{2+}$, $Tm^{3+}$, $Y^{3+}$ that emitted as 650 nm. Since some applications require an infrared persistence, the phosphor $Y_3Ga_5O_{12}$:$Cr^{3+}$ (abbreviated YGG) was developed. This system was improved by incorporating $Dy^{3+}$ to improve the population traps for the system. Since the YGG system emits at 710 nm and can be seen with the unaided eye, $La_3Ga_5O_{12}$:$Cr^{3+}$ was developed with an emission at 730 nm. Following this discovery, many gallium garnet and gallium germanium/silicate garnet hosts, such as $La_3Ga_5GeO_{14}$:$Cr^{3+}$, $Dy^{3+}$, were synthesized to have long persistence times with ultraviolet (302/365 nm) and deep ultraviolet excitation (254 nm). See, for example, Jia, D.; Lewis, L. A.; Wang, X. *Electrochemical and Solid-State Letters* 2010, 13(4), J32-J34. To further shift the emission to 900 nm, $La_3In_2Ga_3O_{12}$:$Cr^{3+}$, $Dy^{3+}$ was developed.

Since the above systems are optimally excited with a 254 nm source, research into designing solar pumped persistent IR phosphors has continued. $ZnGa_2O_4$:$Cr^{3+}$ is the first initial solution that was discovered to satisfy all of these requirements. Following the discovery of persistent $ZnGa_2O_4$:$Cr^{3+}$ emission, $Nd^{3+}$ is incorporated as an optimal codopant that can extend the persistence of $Cr^{3+}$ emission. This was further modified to $Zn_{0.96}Ga_{1.8}In_{0.2}O_4$:3% $Cr^{3+}$,1% $Nd^{3+}$ to push the emission further into the infrared. Silicon can also be introduced to the system ($Zn_{0.96}Ga_{1.8}In_{0.2}SiO_6$:3% $Cr^{3+}$,1% $Nd^{3+}$) to yield a transparent glass.

In order to achieve solar pumping using a persistent $Cr^{3+}$ emission, the host bandgap is modified to bring the $Cr^{3+}$ ground state closer to that of the host conduction band. This is accomplished by replacing part of the Ga and Si with Sb and Te into the matrix. An example of this strategy is $Zn_{0.96}SbGaTe_{0.1}O_{4.15}N_{0.05}$:3% $Cr^{3+}$,1% $Nd^{3+}$.

SUMMARY OF THE INVENTION

Embodiments of the present invention include compositions and methods of making such compositions. These compositions are phosphors that emit infrared radiation when excited by incident radiation with a wavelength of about 100 nm to 700 nm and where the embodiment has the following general chemical formula: $Zn_{(1-n\%-m\%-l\%)}Sb_xGa_{2-x}Te_zO_{4+2z-y}N_y$: n % $Cr^{3+}$, m % P, l % Q, where Zn is zinc, Sb is antimony, Ga is gallium, Te is tellurium, O is oxygen, N is nitrogen. Additionally, x can vary from 0 to 2 and refers to the molar concentration of Sb in the formula, y can vary from 0 to 0.5 and refers to the molar concentration of N in the formula, z can vary from 0 to 1 and refers to the molar concentration of Te in the formula. $Cr^{3+}$ is trivalent chromium ion, P is a codopant and Q is a second codopant. Also, n can vary from 0 to 10 and is the doping concentration emission center $Cr^{3+}$, m can vary from 0 to 10 and is the codoping concentration of codopant P, l can vary from 0 to 10 and is the codoping concentration of codopant Q.

DETAILED DESCRIPTION OF THE INVENTION

Figure 1:
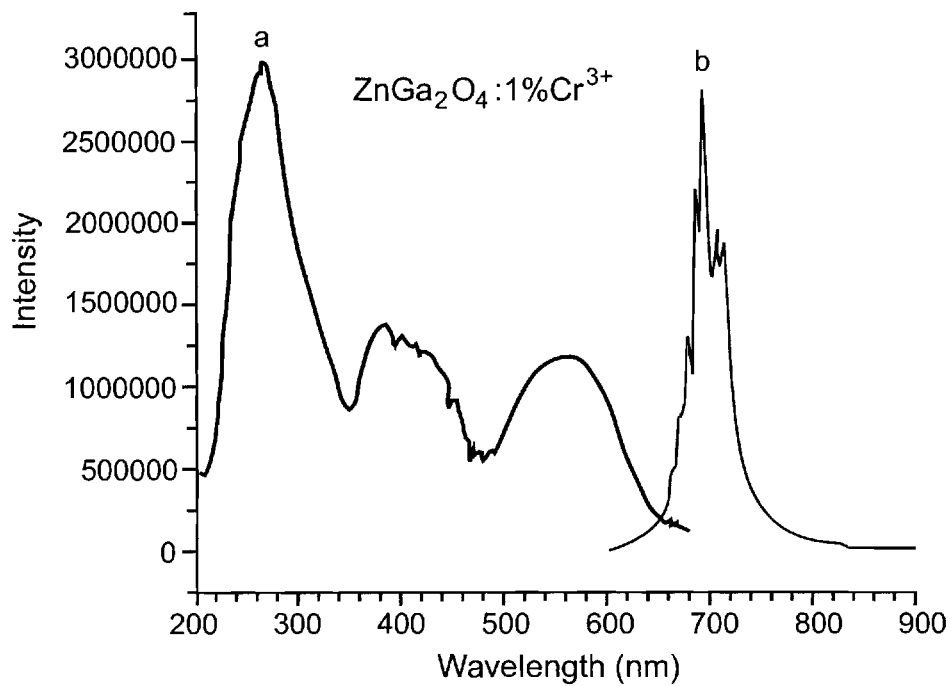
FIG. 1 shows the excitation (curve a) and emission (curve b) spectra of $ZnGa_2O_4$:1% $Cr^{+3}$.

Embodiments of the present invention include compositions and methods of making such compositions. These compositions are phosphors that emit infrared radiation when excited by incident radiation with a wavelength of about 100 nm to 700 nm and where the embodiment has the following general chemical formula: $Zn_{(1-n\%-m\%-l\%)}Sb_xGa_{2-x}Te_zO_{4+2z-y}N_y$: n % $Cr^{3+}$, m % P, l % Q, where Zn is zinc, Sb is antimony, Ga is gallium, Te is tellurium, O is oxygen, and N is nitrogen. Additionally, x can vary from 0 to 2 and refers to the molar concentration of Sb in the formula, y can vary from 0 to 0.5 and refers to the molar concentration of N in the formula, z can vary from 0 to 1 and refers to the molar concentration of Te in the formula. $Cr^{3+}$ is a trivalent chromium ion, P is a codopant and Q is a second codopant. Also, n can vary from 0 to 10 and is the doping concentration emission center $Cr^{3+}$, m can vary from 0 to 10 and is the codoping concentration of codopant P, l can vary from 0 to 10 and is the codoping concentration of codopant Q.

Codopant P and secondary codopant Q are each independently selected from the group consisting of: mono valence ions, divalent ions, trivalent ions, tetravalent ions, pentavalent ions, and a combination thereof. Preferably, codopant P and secondary codopant Q are each independently selected from the group consisting of: (a) $Li^+$, $K^+$ and a combination thereof; $Mg^{2+}$, $Ca^{2+}$, $Mn^{2+}$ and a combination thereof; $Nd^{3+}$, $Dy^{3+}$, $Al^{3+}$, $Y^{3+}$ and a combination thereof; $Ti^{4+}$, $Si^{4+}$ and a combination thereof; and $P^{5+}$, $V^{5+}$ and a combination thereof.

The codoping of P and Q can have the function of increasing trap populations through the codopants or through the defects created by them. The codoping of P and Q can also have the function of sensitizing $Cr^{3+}$ emission through energy transfer or persistence energy transfer.

An example of a phosphor having the above general chemical formula is:

$Zn_{0.96}SbGaTe_{0.1}O_{4.15}N_{0.05}$:3% $Cr^{3+}$,1% $Nd^{3+}$, wherein x=1, y=0.05, z=0.1, n=3, m=1, l=0 and P=$Nd^{3+}$.

In the general chemical formula given above, Zn, Sb, Ga, Te, O and N can each be partially replaced by other ions to form a host solid solution for the purpose of shifting $Cr^{3+}$'s emission wavelength.

Zn, Sb, Ga, Te, O and N can also each be partially replaced by other ions to form a host solid solution for the purpose of modifying energy location of $Cr^{3+}$ relative to the host bandgap in order to enhance solar pumping rate and to extend persistence of $Cr^{3+}$ emission.

Zn, Sb, Ga, Te, O and N can also each be partially replaced by other ions to form a host solid solution for the purpose of modifying energy location of P and Q relative to the host bandgap in order to enhance persistence of $Cr^{3+}$ emission.

Zn, Sb, Ga, Te, O and N can also each be partially replaced by other ions to form a host solid solution for the purpose of host sensitization to $Cr^{3+}$ emission and persistence.

Zn, Sb, Ga, Te, O and N can also each be partially replaced by other ions to form a host solid solution for the purpose of modifying host phonon energy to reduce non-radiative emission rate of $Cr^{3+}$ or to reduce thermal activation rate of traps.

Zn, Sb, Ga, Te, O and N can also each be partially replaced by other ions to form a host solid solution for the purpose of making glass, nanoparticles or crystals.

For example, Sb is replaced with In, x=0.2, y=0, z=0, P=$Nd^{3+}$, n=3, m=1, l=0, wherein the phosphor becomes $Zn_{0.96}Ga_{1.8}In_{0.2}O_4$:3% $Cr^{3+}$,1% $Nd^{3+}$.

Another example is wherein Sb is replaced with In and Te with Si, x=0.2, y=0, z=1, P=$Nd^{3+}$ and n=3, m=1, l=0, producing a sol-gel composition as $Zn_{0.96}Ga_{1.8}In_{0.2}SiO_6$:3% $Cr^{3+}$, 1% $Nd^{3+}$.

Phosphor powders or sol-gel glass were synthesized by either solid state chemical reaction methods or sol-gel combustion methods. In a typical chemical reaction scheme, raw powder materials were mixed and ground together. The mixture was pre-sintered at 900° C. to decompose some of the raw materials such as acetate, hydroxide or nitrate. After cooling, the mixture was mixed again and then sintered at a temperature over 1400° C. for over 2 hours. This second temperature ensures that host matrix is formed and chromium is incorporated into the host matrix. A subsequent heat treatment for 2-4 hours between 1000-1400° C. may be used. Longer sintering times are acceptable, though sintering for shorter than an hour may not achieve a complete reaction. The preparation can be more involved if the formula becomes more complicated.

Example 1

An example is given for $ZnGa_2O_4$:1% $Cr^{3+}$, where x=0, z=0 and y=0, n=1, m=1 and l=0.2.96 g of ZnO, 6.97 g of $Ga_2O_3$ and 0.06 g of $Cr_2O_3$ were mixed well and placed into a crucible. The crucible was heated in a tube furnace under air at 900° C. for two hours. The crucible was cooled to room temperature, and the contents were ground using an agate mortar and pestle. The contents were placed back into a clean crucible and heated to 1400° C. for an additional two hours under air. The resulting solid was ground a second time with an agate mortar and pestle, to yield the final product.

Figure 2:
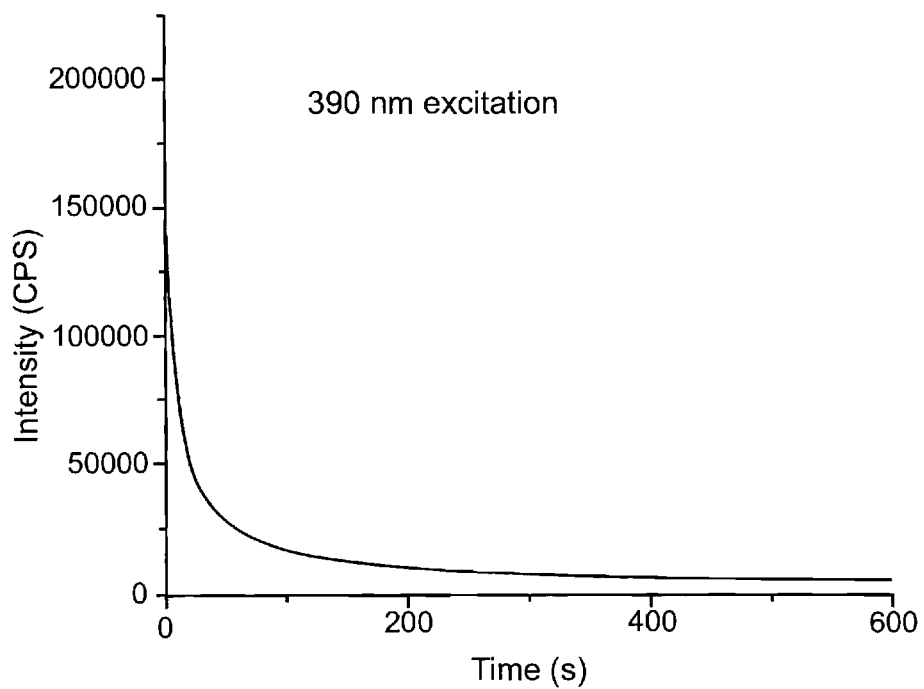
FIG. 2 shows the afterglow decay curve of $ZnGa_2O_4$:1% $Cr^{+3}$ after being excited at 390 nm and being monitored at 700 nm.

The excitation and emission spectra are shown in FIG. 1. The afterglow decay curve, monitored at 700 nm, is shown in FIG. 2.

Example 2

An example is given for $Zn_{0.96}SbGaTeO_{5.95}N_{0.05}$:3% $Cr^{3+}$,1% $Nd^{3+}$. ZnO, $Sb_2O_3$, $Ga_2O_3$, GaN, $TeO_2$, $Cr_2O_3$ and $Nd(NO_3)_3$ were selected as raw materials. The materials were mixed in a ratio dictated by the formula. Excess $Sb_2O_3$, GaN and $TeO_2$ were required to cover the losses during sintering.

Pre-sintering at 750° C. to 900° C. for an hour was needed to melt some of the components such as GaN. To reduce the loss of materials above their boiling temperature, a mid-step sintering was performed at 1200° C. for an hour. A final sintering step at 1400° C. for two hours was performed to ensure the complete incorporation of chromium ions.

Figure 3:
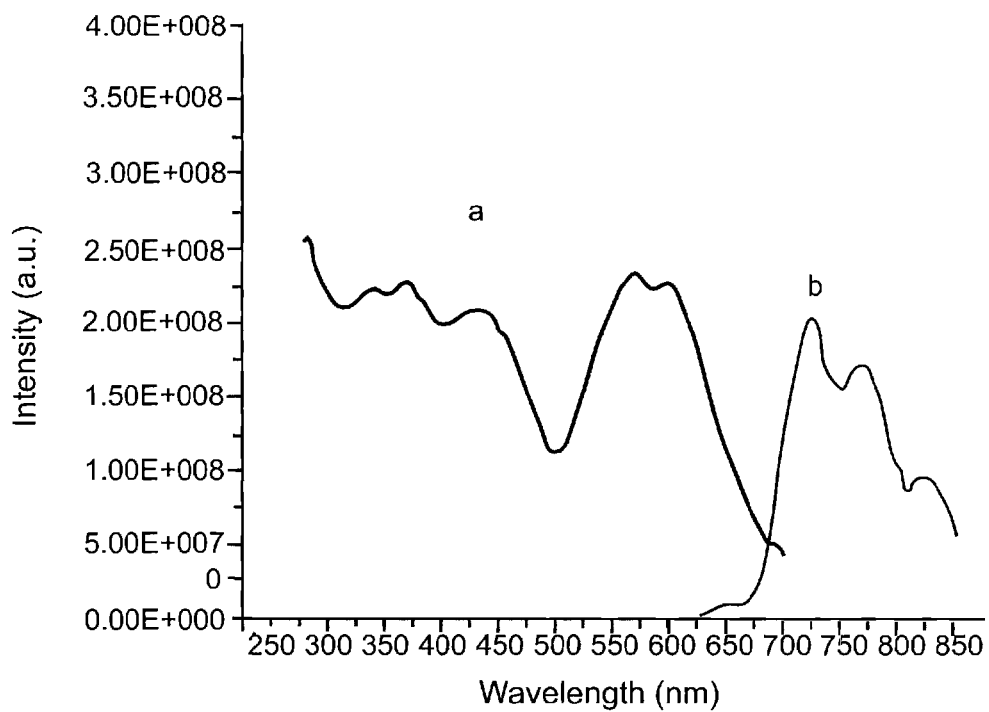
FIG. 3 shows the excitation (curve a) and emission (curve b) spectra of $Zn_{0.96}SbGaTeO_{5.95}N_{0.05}$:3% $Cr^{3+}$,1% $Nd^{3+}$.
Figure 4:
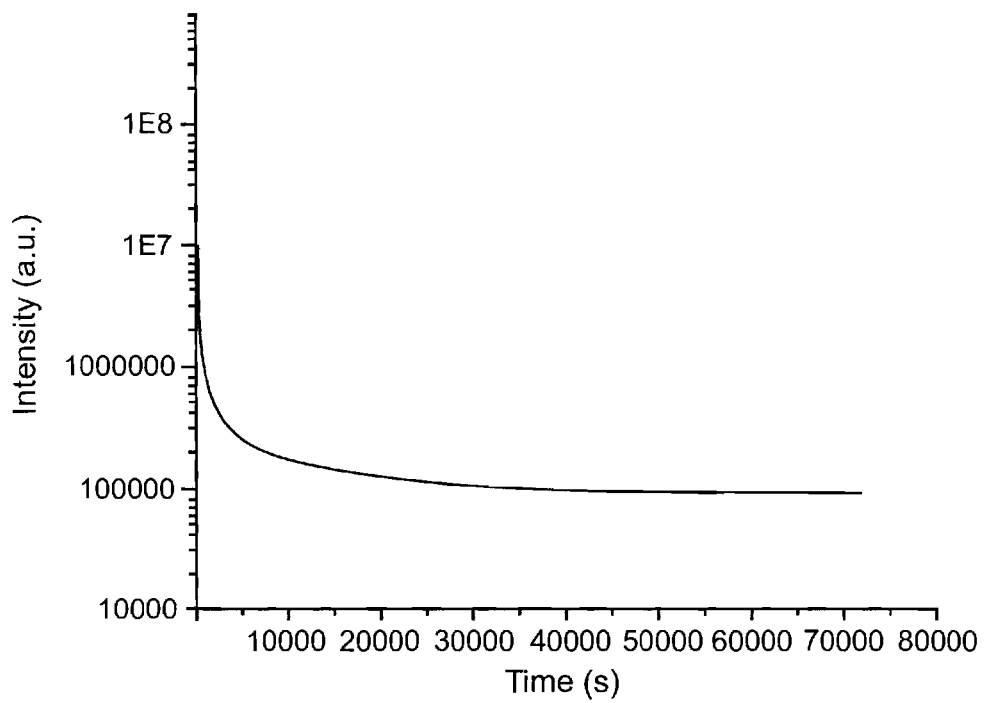
FIG. 4 shows the afterglow decay curve of $Zn_{0.96}SbGaTeO_{5.95}N_{0.05}$:3% $Cr^{3+}$,1% $Nd^{3+}$.

The excitation and emission spectra are shown in FIG. 3. The afterglow decay curve is shown in FIG. 4.

Example 3

A salted sol-gel combustion technique is used when all raw materials are in the liquid form. In this example, $ZnIn_{0.2}Ga_{1.8}O_4$:3% $Cr^{3+}$,1% $Nd^{3+}$ is produced. Zinc acetate, $In(NO_3)_3$, $Ga(NO_3)_3$, $Cr(NO_3)_3$ and $Nd(NO_3)_3$ were used as starting materials, while triethanolamine (TEA) was used as a fuel. All components are dissolved in distilled water and then heated at 65° C. to make a semi-dry slurry. Next, the temperature was raised to 105° C. to produce a puffy yellowish dry gel. This gel was heated at 300° C., at which point the TEA fuel was ignited. Once the gel was burnt, a dark gray puffy powder was obtained. The resulting powder was collected and sintered at 1400° C. for two hours to produce a fine pink powder. It should be noted that the amount of TEA needs to be properly calculated to avoid a grey color by ensuring the stoichiometry of nitrogen and carbon atoms.

While this invention has been described with respect to exemplary embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A phosphor that emits infrared radiation when excited by incident radiation with a wavelength of about 100 nm to 700 nm, having the chemical formula:

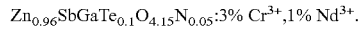

$Zn_{0.96}SbGaTe_{0.1}O_{4.15}N_{0.05}$:3% $Cr^{3+}$,1% $Nd^{3+}$.

2. A phosphor that emits infrared radiation when excited by incident radiation with a wavelength of about 100 nm to 700 nm, having the chemical formula:

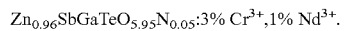

$Zn_{0.96}SbGaTeO_{5.95}N_{0.05}$:3% $Cr^{3+}$,1% $Nd^{3+}$.

* * * * *